Dec. 20, 1955 T. E. BAUER 2,727,614
DISTRIBUTOR OR DEFLECTOR FOR THE DISCHARGE CHUTE OF
GRAIN ELEVATORS, SILOS, AND SUCH STORAGE CONTAINERS
Filed April 21, 1954

INVENTOR.
Thomas E. Bauer.
BY
DES JARDINS, ROBINSON & KEISER.
Albert F. Robinson
HIS ATTORNEYS.

United States Patent Office 2,727,614
Patented Dec. 20, 1955

2,727,614

DISTRIBUTOR OR DEFLECTOR FOR THE DISCHARGE CHUTE OF GRAIN ELEVATORS, SILOS, AND SUCH STORAGE CONTAINERS

Thomas E. Bauer, Cincinnati, Ohio

Application April 21, 1954, Serial No. 424,577

7 Claims. (Cl. 193—2)

This invention relates to a distributor or deflector for the discharge chute of grain elevators, silos, and such storage containers where the contents thereof are discharged for being conveyed away, and it particularly pertains to those storage containers having steps or ladders mounted within the discharge chute for access in and exit from the interior of said storage containers through the discharge chute.

Heretofore, the deflectors or distributors have been built into a side wall of the chute and hinged thereto, forming a part thereof. Moreover, where used, a portion of the wall container forms one of the walls of the chute, and hence the bottom end of the chute needs to be extended to the bottom or ground level of the container although the bottom of the chute has no utility and is in fact a disadvantage.

The practice heretofore has been to build the chute into the wall of the storage container with a portion of the wall of the container forming one wall of the chute. A portion of this common wall is cut out to provide an opening in which a closure panel is hinged at its bottom end for being swung transversely of the chute opening to serve as a distributor or deflector for discharging the contents from the container out through the opening in the side wall. One of the disadvantages of this construction is that the chute needs to be extended to the ground level with the container although the bottom of the chute, below the cut out opening, is not only of no purpose but is objectionable in that some of the discharge material collects therein and cannot be easily removed. In modern constructions the chutes are separate from the containers and are of light material, such as sheet metal. Hence, a cut out panel from the side of a sheet metal chute is not strong enough to function as a distributor or deflector, and the chute wall is not rigid and strong enough to have a cut out panel pivoted thereto without involving special construction which would be economically prohibitive.

Accordingly, one of the principal objects of my invention is a deflector or distributor separate and independent of the chute and the storage container.

Another object of the invention is a deflector or distributor attached to the storage container independently of the chute.

Another object of the invention is a deflector or distributor which is simple in construction and efficient in operation.

A still further object of the invention is a deflector or distributor which can be applied to conventional storage containers without requiring any reconstruction thereof.

Further objects, and objects relating to details of construction and economies of operation, will readily appear from the detailed description to follow. In one instance, I have accomplished the objects of my invention by the device and means set forth in the following specification. My invention is clearly defined and pointed out in the appended claims. A construction constituting a preferred embodiment of my invention is illustrated in the accompanying drawings, forming a part of this specification, in which:

Figure 1:
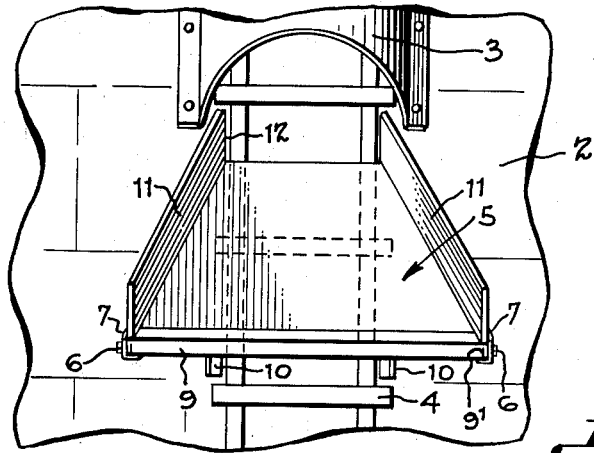
Fig. 1 is a perspective view of a distributor embodying the invention applied to a conventional storage container, the distributor being in operative position.
Figure 2:
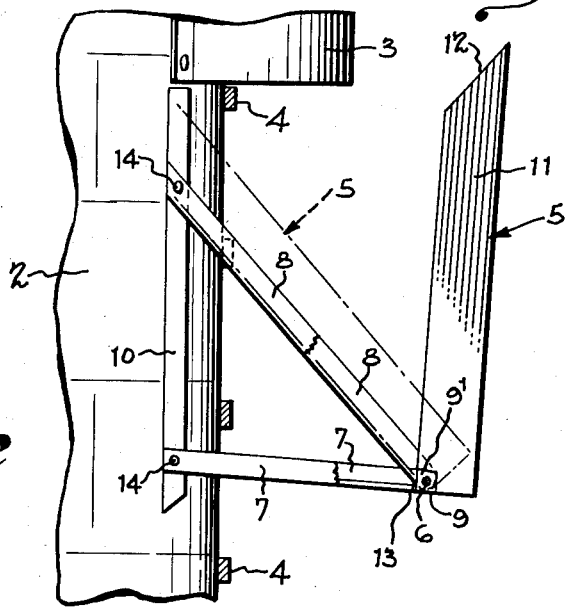
Fig. 2 is a detailed view, similar to Fig. 1, with the deflector pivoted to inoperative position.
Figure 3:
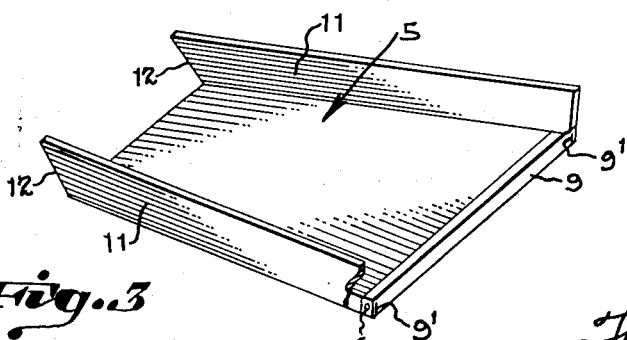
Fig. 3 is a detailed view of the deflector.

Generally described, the invention comprises a pair of triangular frames disposed in spaced apart relation with the base portions secured to the outside wall of the container beneath the discharge end of the chute which is fixed to the side wall of the container. Steps are provided on the outside wall of the container extending up through the chute, and a frame is fastened to the wall of the container on opposite sides of these steps. The frames are of a length to project outwardly a substantial distance, preferably for a distance at least equal to the diameter of the chute. A deflector, in the form of a flat panel or sheet is pivoted to the remote ends of the frame supports in order to permit its upper end to be swung to and away from the side of the container. When the top end of the deflector is swung adjacent the container, it is in a position to direct and distribute the discharged material from the chute outwardly away from the wall of the container. The deflector is so mounted in respect to the frame supports that when in operative position against the side of the container, it will be supported upon the top rails of the side frame members.

Referring specifically to the drawings in which like numerals designate like parts, numeral 2 is the wall of a conventional silo made of any suitable material and having a discharge chute 3 extending down from the top on one side to terminate a substantial distance from the ground level or base of the silo. This chute 3 is usually made of sheet metal and is cylindrical in form. Steps 4 are fixed to the side of the silo extending up through the chute for giving access into the silo.

A distributor or deflector 5, referred to generally as a plate, is pivoted at 6 by rail 9 to a pair of supports 7, fixed to the silo, for being swung towards and away from the side of the silo. The supports are secured to the wall of the silo beneath the discharge end of the chute. Ends 9' of rail 9 are bent.

Each of the supports comprises a top rail 8, a bottom rail 7 and an end rail 10, all jointed end to end to form a frame which is in the form of a right triangle. These rails may be conventionally joined at their ends by elbows or similar fittings. The frame members are attached to the wall of the silo, on opposite sides of the steps 4, with the end rails 10 adjacent thereto. The distributor 5 is so hinged to the frame support members 7 that its bottom side margins will rest upon top rails 8 when it is swung into operative position with its top end adjacent the side of the silo, and be inclined thereto at about a forty-five degree angle. The deflector is in the form of a trough with side walls 11 whose ends, adjacent the silo, are beveled at 12. The deflector is preferably a relatively thick board or plank of any suitable material, such as laminated plywood, treated to be weather resistant or inherently of that character. Limit stops 13 are provided at the hinged portion so that the deflector can be moved outwardly away from the side of the silo to inoperative position, just off of center, to be balanced outwardly out of clearance with the discharge chute. Limit stops 13 are the bottom edges of the ends of the longitudinally disposed sides of supports 7, said supports being typified by conventional angle irons. The bottom edges of the horizontally disposed sides of the angle irons terminate about an inch short of the bottom ends of the vertically disposed sides of the angle irons. Likewise, the horizontally disposed sides of the angle iron supports 8 may also terminate about an inch short of the vertically disposed sides thereof. The invention is not limited, however, to any particular limit stops as they may be of any construction.

The rails or angle iron supports 7, 8 and 10 are fastened in end to end relation by any suitable means, such as bolts 14.

The free end of the deflector 5, adjacent the silo, may, if desired, be made substantially wider than the chute 3, in which event that end portion between sides 11 can be sufficiently shorter to freely clear the bottom end of the chute 3 when swung toward and away from the side of the silo.

The chute 3 terminates at a sufficient distance above the bottom of the container for a wagon or other transport means to be driven therebeneath for being loaded. With the use of the deflector, the discharged material can be distributed to any distance away from the side of the silo, but, even if the discharge material is piled up on the ground, rather than being loaded into transport means, it will be deposited well away from the side of the silo so as not to interfere with one using the steps into the chute.

From the foregoing description, the construction and operation of the deflector or distributor is obvious. The deflector and support members are made up as a unit or units to be readily attached in position to the wall of a silo beneath the discharge end of the chute. The deflector is swung into position against the side of the silo for catching the discharged material to distribute it to a point remote from the side of the silo. When one is using the steps on the side of the silo, the deflector can be swung to inoperative position away from the steps so as not to interfere with their use.

I am aware that there may be various changes in details of construction without departing from the spirit of my invention, and, therefore, I claim my invention broadly as indicated by the appended claims.

Having thus described my invention, what I claim as new and useful and desire to secure by U. S. Letters Patent, is:

1. A distributor for a stationary non-rotatable storage container comprising a pair of triangular frame members, each having a base side adapted to be fixed to a foundation and an inclined top side, and a distributor plate pivoted to the apex of the frame members opposite the base sides, said distributor plate being adapted to seat upon the inclined top sides of the frame members when in operative position.

2. The distributor of claim 1 provided with stop means for limiting the pivotal movement of the pivoted distributor plate in a direction opposite to its operative position on the inclined top sides of the frame members.

3. A distributor for the discharge chute of a stationary non-rotatable storage container comprising a pair of angular frame members, each having a base end adapted to be fixed to a foundation for providing a top side downwardly inclined away from said foundation and secured in downwardly inclined position by a bottom side, a distributor plate pivoted between the frame members adjacent the bottom ends of the downwardly inclined top sides of said frame members and adapted to be pivoted to and away from a seating position on the inclined top sides of the frame members, and a stop means for limiting the pivoted movement of the distributor plate away from seating position, said distributor plate being substantially coextensive in length with the inclined top sides of the frame members for being disposed closely adjacent to the foundation when the distributor plate is in seating position on said frame members.

4. The distributor of claim 3 in which the limit stop means is a portion of each of the frame members disposed to be in abutting relation with the pivoted end of the distributor plate.

5. The distributor of claim 4 in which there is a side of the frame member opposite the angle portion for securing said frame members to the foundation.

6. The distributor of claim 5 in which the top sides of the frame members are angle irons with one of the sides of the angle iron parallel with the distributor plate and its other side vertically disposed for providing a corner edge supporting seat for the distributor plate.

7. A distributor for a discharge chute disposed on the wall of a storage container comprising a pair of frame members, each having a pair of arms disposed at an angle to each other and one arm of each pair of the frame members being adapted to be fitted to the wall of the storage container, with the other arm disposed at an angle thereto for projecting its free end remote from the container, a distributor plate having its bottom end pivoted to the projecting free end of the angularly disposed arms, said distributor plate being of a length substantially in excess of the angularly projecting arms for permitting the free end of the plate being swung to and away from the wall of the container, and stop means associated with the pivotal portion for limiting the pivoted movement of the distributor plate away from the container past dead center.

References Cited in the file of this patent

UNITED STATES PATENTS

| | | |
|---|---|---|
| 414,721 | Pitts | Nov. 12, 1889 |
| 1,050,953 | Kint | Jan. 21, 1913 |
| 1,448,646 | Ward | Mar. 13, 1923 |
| 1,619,626 | Mosel | Mar. 1, 1927 |
| 2,454,548 | Brinkert | Nov. 23, 1948 |